Figure 1:
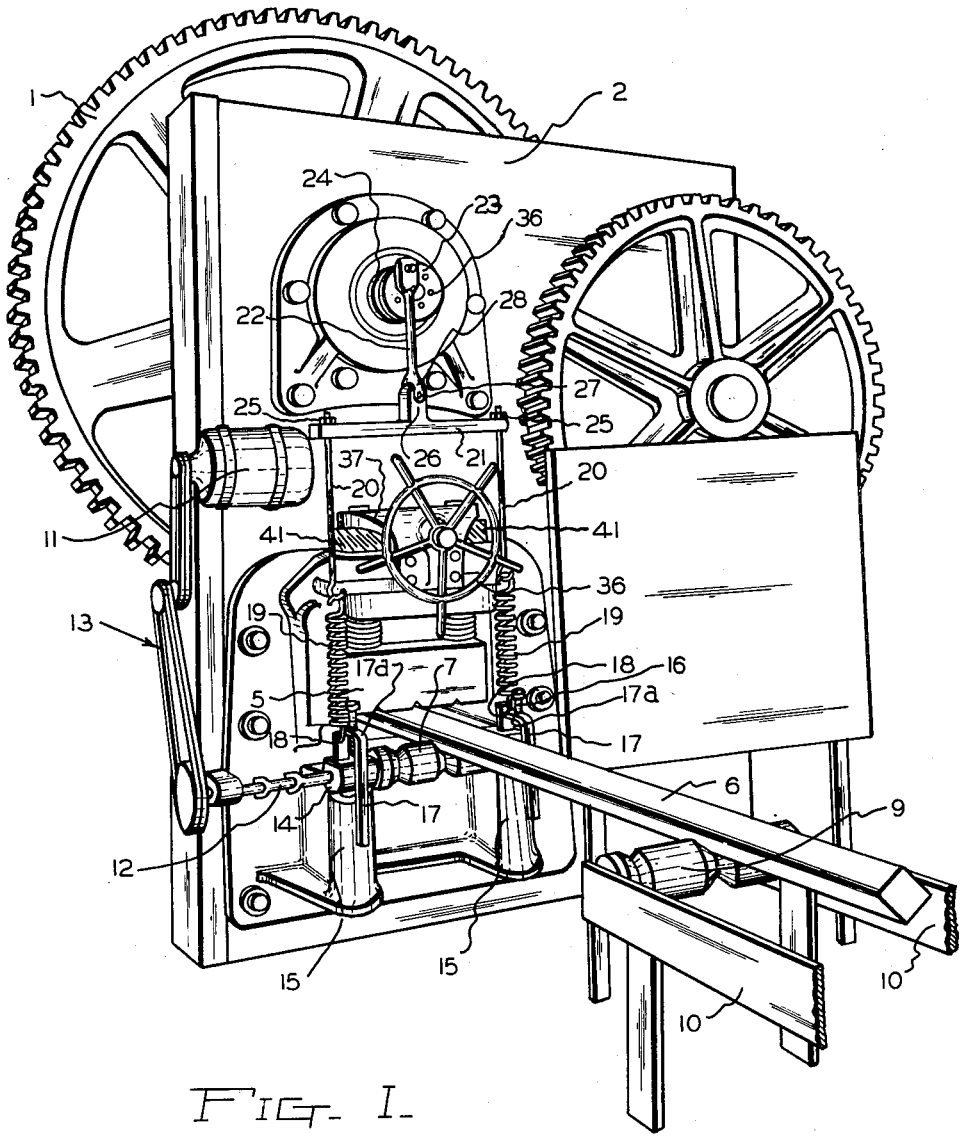

Oct. 14, 1952 M. P. LEFERE 2,613,739
SHEAR ACCESSORY

Filed Jan. 23, 1948 2 SHEETS—SHEET 1

Inventor
MAURICE P. LEFERE
By Beaman & Patch.
Attorneys

Oct. 14, 1952 M. P. LEFERE 2,613,739
SHEAR ACCESSORY
Filed Jan. 23, 1948 2 SHEETS—SHEET 2
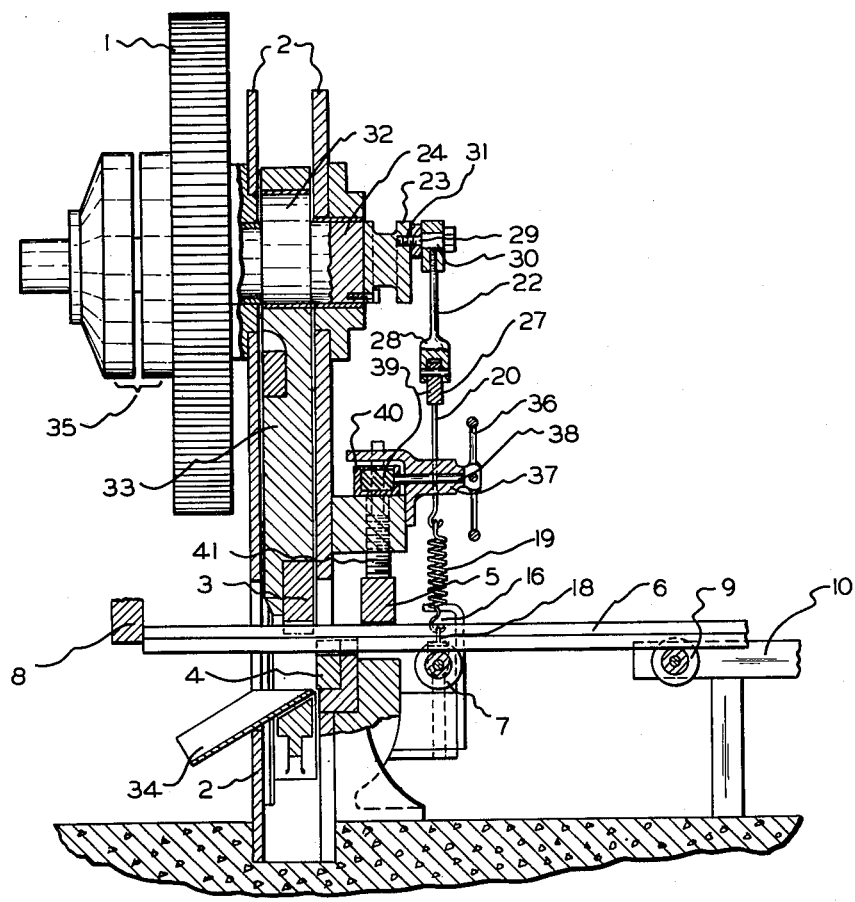
FIG. II.
Inventor
MAURICE P. LEFERE
By Beaman & Patch
Attorney Patented Oct. 14, 1952

2,613,739

UNITED STATES PATENT OFFICE 2,613,739

SHEAR ACCESSORY

Maurice P. Lefere, Jackson, Mich., assignor to Lefere Forge & Machine Company, Jackson, Mich., a corporation of Michigan Application January 23, 1948, Serial No. 3,887

2 Claims. (Cl. 164—49)

This invention relates to metal shearing, punching or stamping machines of the type which employ opposed operating parts between which the metal object to be operated upon is fed when the said parts are spaced apart prior to an operative movement thereof to effect the desired shearing, punching or stamping operation.

More particularly, the invention relates to machines of the above type which are employed in a metal forging shop and to such as are intended to operate upon relatively heavy objects in the form of elongated steel bars or the like, and which are difficult to handle for the purpose of advancing them through the machine for their successive working operations.

Specifically, the invention is concerned with shearing machines of the type employed to cut steel or other metal bars or stock into separate lengths, pieces or billets and which employ a pair of transversely extending shear plates consisting of a lower and fixed shear plate and an upper shear plate which is reciprocable vertically, by a ram or like action, into and out of shearing relationship with respect to the bar stock advanced into position between the shear plates at a time, during the machine operating cycle, when the shear plates are spaced apart.

With the existing metal shearing and like machines of the above described type, and which are employed to deal with heavy bar stock or like workpieces, difficulty has been experienced in feeding the latter through the machine and this operation has hitherto mainly been accomplished by hand and has involved the use of several operators with relatively high labor costs.

It is an object of the present invention to provide, for use in conjunction with machines of the above described type, feeder means by which the bar stock or like workpieces can be handled easier and more expediently and this with the saving of manpower and its attendant labor costs.

It is also an object of the invention to provide feeder means by which bar stock or the like can be fed automatically through a shearing machine to cut metal bar stock into separate lengths, and this without the necessity of employing but the minimum of manpower and with the prevention of a tendency for the bar stock to move or "bounce" backwards during, or between, the successive shearing operations.

It is a further object of the invention to provide a bar stock or like feeder means of the character, and for the purpose above described, which is rotatable to advance or feed the bar stock into the required operating position but which is itself mounted for translational and, normally, vertical movements to so position the same with respect to the shearing or like machine parts that during the opened-up condition of the latter the feeder means supports the bar stock clear of the shearing members and is thereby able to feed the bar stock forwards between the shearing members while the bar stock is subjected to the minimum of friction.

Yet another object of the invention is to provide a rotary feeder means for advancing metal bar stock past the shear plates of a metal bar stock shearing machine, which rotary feeder means is resiliently supported in position and is thereby permitted to partake of a certain degree of self-adjustment to compensate for the heavy working or operating conditions encountered with the operation of such machines as well as to provide for the varying of the effective size of the opening through which the bar stock is fed. In other words, it is an object of the invention to provide, in a shearing machine of the kind mentioned, a rotary feed roll upon which the bar stock can be supported and fed by the roll between the opened-up shear plates of the machine but which feed roll has a somewhat sloppy supporting arrangement which permits the feed roll to stand up to the correspondingly irregular and heavy operating conditions encountered with the use of such machines.

These and other objects and advantages of the invention will be rendered clear from a consideration of the following description of one practical application of the invention with reference to the accompanying drawings in which:

Fig. I is a front perspective view of a shearing machine incorporating one specific form of bar or work feed and bar or work feed controlling mechanism in accordance with the invention, and Fig. II is a vertical sectional view of Fig. I, showing the said mechanism in the feeding position, prior to the shearing operation.

In carrying the invention into effect in one convenient manner as illustrated in the drawings and as applied to a conventional type of shearing machine, comprising a bull gear 1 mounted behind a frame 2 in which the lower and fixed shear plate 3 and the vertically slidable shear plate 4 are mounted, there are provided on the front of the frame a vertically adjustable abutment block 5, which functions to hold-down the bar stock 6 to be sheared, and a resiliently mounted bar feed roller 7 over which the bar stock is fed into position between the shear plates 3 and 4 and is held up against a fixed abutment wall 8 at the rear of the machine.

The bar stock is conveniently fed to the feed roller 7 from a conveyor device consisting of a series of transverse rollers 9 (only one of which is shown) rotatably supported at longitudinally spaced intervals between the side plates 10 of a fixed framework arranged in front of the machine as shown particularly in Fig. I. This conveyor device is conveniently downwardly inclined towards the shearing machine so as thereby to assist in the obtaining of an automatic feeding movement of the bar stock in the operation of the machine.

The bar feed roller 7 is positively and continuously rotated, in the operation of the machine, as from an electric motor 11 driving on to the roller spindle 12 through the belt and pulley arrangement indicated generally at 13 in Fig. I, it being appreciated, of course, that other drive arrangements may be employed for achieving the same object, namely the positive and continuous rotation of the feed roller and this in the direction as indicated by the arrow in Fig. II, which direction is that in which the bar stock is fed.

The spindle part 12 projecting from one end of the feed roller is made of universal joint construction and is axially continuous with the roller 7, which latter is supported for rotation at its opposite ends in vertically reciprocable bearing blocks 14 positioned above vertical leg portions 15 of the machine frame and limited in their vertical motion by the screwed studs 16, which are passed through the overhead horizontal limbs 17a of the L-shape brackets 17 secured to extend vertically from the frame legs 15.

These screwed studs 16, therefore, are vertically adjustable and thereby allow the permitted vertical motion of the bearing blocks 14, and hence of the feed roll 7, to be varied within limits.

It should be pointed out here that the purpose of the continuously rotating feed roll 7 is to provide for the easy positioning of the bar stock 6 between the shear plates of the machine and the holding of the bar up against the abutment wall 8. This last mentioned condition is achieved by rotating the feed roll continuously in the direction of feed of the bar stock, whereby the bar stock, resting upon the feed roll, tends always to be urged towards the abutment 8 and thereby opposes or resists any tendency for it (the bar) to move in the opposite direction away from this abutment. At the same time it is necessary, if undue friction is to be avoided, that the bar stock, while being fed into position for shearing is held just clear of the holding-down block 5 as well as of the shear plates. Such a condition is possible of being attained by the construction and mounting of the feed roll 7 and its associated adjustment features as already indicated and now further to be described.

Returning, therefore, to the feed roll mechanism each bearing block 14 has a cylindrical surface by which it engages the top of its frame leg 15 in such manner as to be free to partake of a certain degree of axial rolling motion to compensate for the severe jarring nature of the shearing action. Also each block 14 has a top flat truncated face which provides an abutment surface for the lower ends of the screwed studs 16.

Each bearing block 14 also has an upstanding lug 18 to which the lower end of a vertically extending coil spring 19 is anchored. There are thus two such coil springs, each of which is anchored at its upper end to the hook-like lower end of a rod 20 depending from and secured to a transverse common beam 21 itself centrally and pivotally connected with the lower end of a vertically extending connecting rod 22 eccentrically secured at its upper end upon a crank 23 at the front end of the main driving shaft 24 of the shearing machine.

The rods 20 are shown secured at the opposite ends of the beam 21 by means of nuts 25 engaging the screw-threaded upper extremities of the rods, whereby some initial adjustment of the effective lengths of these rods is possible, and the beam is shown formed with a central upstanding swivel block 26 for the swivel mounting thereon by the cross pivot pin 27 of the lower forked extremity 28 of the connecting rod 22. The latter, at its upper end is shown connected with the crank 23 by means of a screwed stud 29 having an intermediate plain cylindrical portion 30 with which this end of the rod has rotary bearing engagement and which stud is selectively engageable with any one of a number of screwed holes 31 circumferentially spaced around the face of the crank 23. The arrangement permits the effective crank throw to be varied in order to meet particular requirements, since the screwed stud 29 can be readily removed and engaged with any one of the holes 31.

With the construction and arrangement thus far described, rotation of the shaft 24 will produce an eccentric reciprocating motion of the connecting rod 22, which motion will be imparted to the beam 21 to cause the rods 20 to be alternately lifted and lowered during a complete revolution of the shaft. When lifted up into the position as shown in the drawings the coil springs 19, constituting a coil spring and elastic linkage, will be extended and will exert a lifting effort upon the feed roll 7, such as imparts translational motion to the feed roll and raises the upper portion of the roll above the upper plane of the lower and fixed shear plate 4. This upward lifting effort however is limited not only by the crank action but also by the position of the studs 16 and by a previous setting of the hold-down block 5 a condition is automatically obtained, where the bar stock is carried forward into the machine by the feed roll 7 while supported thereon clear of the hold-down block and also the shear plates.

Continued rotation of the shaft 24, however, will lower the connecting rod 22 and associated beam 21 and free the springs 19 to return to a compressed condition in which the feed roll 7 is allowed to descend bodily to a position in which, at the time when the shear plate 3, by the action of the crank 32 and ram 33 (Fig. II), is lowered to effect the desired shearing operation, the bar stock is supported upon the lower and fixed shear plate 4 and the feed roll is thereby relieved of the force of the shearing action.

As shown in Fig. II, the severed bar stock portions can descend from behind the machine via a chute 34.

The rotation of the shaft 32 is controlled by a clutch 35 in known manner.

As above stated the hold-down block 5 is adjustable and this is effected through the medium of the hand-wheel 36 mounted at the front of a frame casting 37 and carrying at the inner end of the spindle 38 a worm gear 39. This worm gear 39 is arranged to actuate a worm gear 40 which in turn rotates a pair of laterally spaced vertical screwed spindles 41 themselves screwed through the casting 37 and carrying the hold-down block 5. Adjustment of the hold-down block is normally an initial operation and permits account to be taken for varying shapes and sizes of the feed bar stock, which latter may contain fairly large irregularities or bends.

A feeding mechanism and arrangement as above described and as illustrated in the drawings is capable of being separately manufactured and applied to existing shearing or like machines or of being incorporated in the construction of such machines de novo.

Having thus described and illustrated one practical form of our invention, which however is not limited in detail to the features therein disclosed, but is capable of modification to suit different requirements or practical considerations, what I claim is:

1. In a machine for shearing heavy bar stock having a fixed shear plate, a movable shear plate, hold-down structure and a stock stop, a feed mechanism for feeding the bar stock between the fixed shear plate and the hold-down structure with the movable shear plate raised comprising a feed roller engageable with the bar stock, means for continuously rotating said roller to feed the bar stock toward the stock stop, means supporting and guiding said roller for vertical upward movement to engage the bar stock to support the same between the fixed shear plate and the hold-down structure while advancing the bar stock toward the stock stop and for vertical downward movement to rest the bar stock upon the fixed shear plate preparatory to shearing, and means connected to said roller for lifting the same to transfer the weight of the bar stock from the fixed shear plate to the roller in timed relationship to the operation of the movable shear plate.

2. A feed mechanism as defined in claim 1 wherein guide bearings are provided for said roller at opposite ends, said bearings being loosely guided so as to withstand the shock of the shearing operation, said roller lifting means being in the form of spring link structure connected to said bearings, and a universal joint connection between said roller and said driving means.

MAURICE P. LEFERE.

REFERENCES CITED

The following references are of record in the file of this patent:

UNITED STATES PATENTS

| Number | Name | Date |
| --- | --- | --- |
| 252,786 | Marggroff | Jan. 24, 1882 |
| 471,824 | Naylor | Mar. 29, 1892 |
| 1,951,177 | Smitmans | Mar. 13, 1934 |
| 2,024,287 | Hazelton | Dec. 17, 1935 |
| 2,320,659 | Sahlin | June 1, 1943 |